United States Patent [19]
Abella et al.

[11] Patent Number: 6,044,347
[45] Date of Patent: Mar. 28, 2000

[54] METHODS AND APPARATUS OBJECT-ORIENTED RULE-BASED DIALOGUE MANAGEMENT

[75] Inventors: Alicia Abella, Scotch Plains; Michael Kenneth Brown, North Plainfield; Bruce Melvin Buntschuh, Berkeley Heights, all of N.J.

[73] Assignees: Lucent Technologies Inc., Murray Hill, N.J.; AT&T Corp., New York, N.Y.

[21] Appl. No.: 08/906,416

[22] Filed: Aug. 5, 1997

[51] Int. Cl.$^7$ ....................................................... G10L 7/08
[52] U.S. Cl. ............................................ 704/272; 704/275
[58] Field of Search ................................... 704/270, 275, 704/231, 240, 258, 257, 200

[56] References Cited

U.S. PATENT DOCUMENTS

| | | | |
|---|---|---|---|
| 5,311,422 | 5/1994 | Loftin et al. ............................. | 364/578 |
| 5,357,596 | 10/1994 | Takebayashi et al. ................... | 704/275 |
| 5,694,558 | 12/1997 | Sparks et al. ............................ | 345/326 |
| 5,748,841 | 5/1998 | Morin et al. ............................. | 704/257 |

OTHER PUBLICATIONS

J. Chu–Carroll and M.K. Brown, "Initiative in Collaborative Interactions—Its Cues and Effects," Working Notes of the AAAI–97 Spring Symposium on Computational Models for Mixed Initiative Interaction, pp. 16–22, Mar. 1997.

S. Whittaker and P. Stenton, "Cues and Control in Expert–Client Dialogues," Proc. of the 26th Annual Meeting of the Association for Computational Linguistics, pp. 123–130, 1988.

M. Walker and S. Whittaker, "Mixed–Initiative in Dialogue: An Investigation into Discourse Segmentation," Proc. of the 28th Annual Meeting of the Association for Computational Linguistics, pp. 70–78, 1990.

H. Kitano and C. Van Ess–Dykema, "Toward a Plan–Based Understanding Model for Mixed–Initiative Dialogues," Proc. of the 29th Annual Meeting of the Association for Computational Linguistics, pp. 25–32, 1991.

R.W. Smith and D.R. Hipp, "Spoken Natural Language Dialog Systems—A Practical Approach," Oxford University Press, pp. 68–73, 1994.

C.I. Guinn, "Mechanisms for Mixed–Initiative Human–Computer Collaborative Discourse," Proc. of the 34th Annual Meeting of the Association for Computational Linguistics, pp. 278–285, 1996.

J. Gordon and E.H. Shortliffe, "The Dempster–Shafer Theory of Evidence," in B. Buchanan and E. Shortliffe, editors, "Rule–Based Expert Systems: The MYCIN Experiments of the Stanford Heuristic Programming Project," Ch. 13, pp. 272–292, Addison–Wesley, 1984.

(List continued on next page.)

Primary Examiner—Richemond Dorvil

[57] ABSTRACT

An object-oriented dialogue manager is provided which allows a computer system or other dialogue processing system to conduct an efficient dialogue with a human user. In an illustrative embodiment, the dialogue manager processes a set of frames characterizing a subject of the dialogue, where each frame includes one or more properties that describe an object which may be referenced during the dialogue. A weight is assigned to each of the properties represented by the set of frames, such that the assigned weights indicate the relative importance of the corresponding properties. The dialogue manager utilizes the weights to determine which of a number of possible responses the system should generate based on a given user input received during the dialogue. The dialogue manager serves as an interface between the user and an application which is ruining on the system and defines the set of frames. The dialogue manager supplies user requests to the application, and processes the resulting responses received from the application. The dialogue manager uses the property weights to determine, for example, an appropriate question to ask the user in order to resolve ambiguities that may arise in execution of a user request in the application.

27 Claims, 6 Drawing Sheets

OTHER PUBLICATIONS

W.G. Cochran, "The Comparison of Percentages in Matched Samples," Biometrika, vol. 37, pp. 256–266, 1950.

M.A. Walker, "Redundancy in Collaborative Dialogue," Proc. of the 15th International Conference on Computational Linguistics, pp. 345–351, 1992.

J.F. Allen, "Discourse Structure in the TRAINS Project," DARPA Speech and Natural Language Workshop, Feb. 1991.

J. Carletta, "Assessing Agreement on Classification Tasks: The Kappa Statistic," Computational Linguistics, 22: 249–254, 1996.

J. Chu–Carroll and S. Carberry, "A Plan–Based Model for Response Generation in Collaborative Task–Oriented Dialogues," Proc. of the 12th National Conference of Artificial Intelligence, pp. 799–805, 1994.

J. Chu–Carroll and S. Carberry, "Response Generation in Collaborative Negotiation," Proc. of the 33rd Annual Meeting of the Association for Computational Linguistics, pp. 136–143, 1995.

P.W. Jordan and B. Di Eugenio, "Control and Initiative in Collaborative Problem Solving Dialogues," Working Notes of the AAAI–97 Spring Symposium on Computational Models for Mixed Initiative Interaction, pp. 81–84, Mar. 1997.

L. Lambert and S. Carberry, "A Tripartite Plan–Based Model of Dialogue," Proc. of the 29th Annual Meeting of the Association for Computational Linguistics, pp. 47–54, 1991.

D.J. Litman and J.F. Allen, "A Plan Recognition Model for Subdialogues in Conversations," Cognitive Science, 11: 163–200, 1987.

D.G. Novick and S. Sutton, "What is Mixed–Initiative Interaction?," Working Notes of the AAAI–97 Spring Symposium on Computational Models for Mixed Initiative Interaction, pp. 114–116, Mar. 1997.

L.A. Ramshaw, "A Three–Level Model for Plan Exploration," Proc. of the 29th Annual Meeting of the Association for Computational Linguistics, pp. 39–46, 1991.

S. Siegel and N.J. Castellan, Jr., "Nonparametric Statistics for the Behavioral Sciences," McGraw–Hill, pp. 284–191, 1988.

A. Abella et al., "Development Principles for Dialog–Based Interfaces," in Proceedings of the ECAI96 Workshop on Dialog Processing in Spoken Language Systems, pp. 1–7, 1996.

J. Chu–Carroll et al., "A Plan–Based Model for Response Generation in Collaborative Task–Oriented Dialogues," in proceedings of the Twelfth National Conference on Artificial Intelligence, pp. 799–804, 1994.

A. Joshi et al., "Living Up to Expectations: Computing Expert Responses," in Proceedings of the Fourth National Conference on Artificial Intelligence, pp. 169–175, 1984.

A. Cawsey et al., "Revising Beliefs and Intentions: A Unified Framework for Agent Interaction," in Proceedings of the Ninth Biennial Conference of the Society for the Study of Artificial Intelligence and Simulation Behavior, pp. 130–139, 1993.

S.W. McRoy et al., "The Repair of Speech Act Misunderstandings by Abductive Inference," Computational Linguistics 21(4), pp. 435–478, 1995.

M.E. Pollack, "A Model of Plan Inference that Distinguishes Between the Beliefs of Actors and Observers," in Proceedings of the 24th Annual Meeting of the Association for Computational Linguistics, pp. 207–214, 1986.

B. Raskutti et al., "Eliciting Additional Information During Cooperative Consultations," in Proceedings of the 15th Annual Meeting of the Cognitive Science Society, 1993.

D.R. Traum et al., "Miscommunication in Multi–modal Collaboration," in Proceedings of the AAAI–96 Workshop on Detecting, Repairing and Preventing Human–Machine Miscommunication, 1996.

P. van Beek et al., "From Plan Critiquing to Clarification Dialogue for Cooperative Response Generation," Computational Intelligence 9(2), pp. 132–154, 1993.

D.G. Bobrow et al., "GUS: A Frame Driven Dialog System," Artifical Intelligence, pp. 155–173, 1977.

S.J. Young et al., "The Design and Implementation of Dialogue Control in Voice Operated Database Inquiry Systems," Speech and Language, pp. 329–353, 1989.

S. Seneff, "TINA: A Natural Language System for Spoken Language Applications," Computational Linguistics, pp. 61–86, 1992.

6,044,347

METHODS AND APPARATUS OBJECT-ORIENTED RULE-BASED DIALOGUE MANAGEMENT

FIELD OF THE INVENTION

The present invention relates generally to dialogue processing systems, and more particularly to object-oriented techniques for managing a dialogue between a processing system and a human user.

BACKGROUND OF THE INVENTION

Dialogue processing systems are expected to come into increasingly widespread use in a variety of speech processing applications, including computer interfaces, automated call handlers, ticket machines, automatic teller machines (ATMs), reservation systems, interactive on-line services, and any other application involving human-machine interaction which can be characterized as a dialogue. If such systems are to become more effective information-seeking, task-executing, and problem-solving agents, they must be able to communicate as effectively with humans as humans do with each other. Conventional dialogue processing systems may be generally classified as question-answer systems, spoken input systems, or variable initiative systems.

In a question-answer system, a user seeks a particular piece of information that the system possesses. Exemplary question-answer systems are described in S. Carberry, "Plan Recognition in Natural Language Dialogue," IT Press, 1990; R. E. Frederking, "Integrated Natural Language Dialogue: a Computational Model," Kluwer Academic Publishers, 1988; G. G. Hendrix, E. D. Sacerdoti, D. Sagalowicz, and J. Slocum, "Developing a Natural Language Interface to Complex Data," ACM Transactions on Database Systems, pp. 105–147, June 1978; R. Wilensky, "The Berkeley UNIX Consultant Project," Computational Linguistics, 14:35–84, 1988; and B. J. Grosz, D. E. Appelt, P. A. Martin, and F. C. N. Pereira, "TEAM: An Experiment in the Design of Transportable Natural Language Interfaces," Artificial Intelligence, 32:173–243, 1987. These question-answer systems generally require user input to be entered via a keyboard, and do not include any significant capability for processing natural spoken language.

Spoken input systems have the added difficulty of requiring robust natural language understanding capabilities. One such system is the MINDS system, described in S. R. Young, A. G. Hauptmann, W. H. Ward, E. T. Smith, and P. Werner, "High Level Knowledge Sources in Usable Speech Recognition Systems," Communications of ACM, pages 183–194, February 1989, which is incorporated by reference herein. The MINDS system uses discourse and dialogue knowledge to aid in the speech recognition task. Another spoken input system is the TINA system, described in S. Seneff, "TINA: A Natural Language System for Spoken Language Applications," Computational Linguistics, pp. 61–86, 1992, which is incorporated by reference herein. This system uses probabilistic networks to parse token sequences provided by a speech recognition system. The VODIS system, described in S. J. Young and C. E. Proctor, "The Design and Implementation Dialogue Control in Voice Operated Database Inquiry Systems," Speech and Language, 329–353, 1989, which is incorporated by reference herein, is a voice operated database inquiry system for a train timetable application. This system uses an object-oriented integrated framework for dealing with interface design, determining how dialogue can aid the recognition process, and providing the dialogue control needed for generating natural speech output. Another spoken input system designed for use in a train timetable application can be found in H. Aust et al., "Philips Automatic Train Timetable Information System," Speech Communication, pp. 249–262, 1995, which is incorporated by reference herein. This system attempts to provide a user-friendly interface, such that users can talk to the system in an unconstrained and natural manner to extract train information. Unfortunately, each of these spoken input systems is generally application specific, and fails to provide a sufficiently general framework for implementing dialogue management across a variety of different applications.

A variable initiative system is one which is capable of taking the initiative in a dialogue under appropriate circumstances, while also knowing when to relinquish the initiative if it determines that the user's input will help guide the system to a quicker solution. An example of such a system is described in D. G. Bobrow, "GUS: A Frame Driven Dialog System," Artificial Intelligence, 155–173, 1977, which is incorporated by reference herein. Conventional variable initiative systems, like the above-noted spoken input systems, are also unable to provide a general dialogue management framework for supporting a large number of diverse applications.

It is therefore apparent that a need exists for dialogue management techniques which are sufficiently general to be used as an application-independent framework for providing dialogue management in a variety of diverse applications.

SUMMARY OF THE INVENTION

The invention provides an object-oriented dialogue manager which allows a computer system or other dialogue processing system to conduct an efficient dialogue with a human user. In an illustrative embodiment of the invention, a dialogue manager processes a set of frames characterizing a subject of the dialogue, where each frame includes one or more properties that describe an object which may be referenced during the dialogue. For example, the object corresponding to a given one of the frames may be a person or other entity for which information has been stored in a database accessible to the system, and a property describing the entity may be the name of the entity. A weight is assigned to each of the properties represented by the set of frames, in such a manner that the assigned weights indicate the relative importance of the corresponding properties. The dialogue manager utilizes the weights to determine which of a number of possible responses the system should generate based on a given user input received during the dialogue. The frames, properties and weights are generally specific to a particular dialogue processing application which is running on the system, but the objects and processing rules of the dialogue manager may remain unchanged regardless of the particular application. The dialogue manager may also make use of other factors, such as dialogue motivators, in determining an appropriate response to a given user input.

The dialogue manager serves as an interface between the user and the application which is running on the system and defines the set of frames. The dialogue manager in the illustrative embodiment converts the user input to a tree representation, and supplies the tree representation to an input filter which serves as an interface between the dialogue manager and the application. The input filter extracts information from the tree representation and places it in a format suitable for processing by the application. If the user input is a user request, the application executes the request to generate a response. The response is then passed through an output filter to place it in a format suitable for processing by the dialogue manager. If executing the user request in the application leads to any ambiguity, the dialogue manager clarifies the user request by directing an appropriate question or questions to the user. As part of this process, the dialogue manager generates an interpretation tree representation of the response, such that the interpretation tree representation includes a different branch for each of a plurality of possible interpretations of the user request. If executing the user request in the application does not lead to any ambiguity, the dialogue manager presents the response to the user.

In accordance with another aspect of the invention, the dialogue manager determines which property a user will be queried about in an initial system response by computing an expected number of subsequent queries for each of the properties of one or more of the frames. This computation may be performed by first selecting one of the properties and designating it as the first property. The expected number of subsequent queries is then computed recursively, given that the first property is the property the user is asked about first. The selection and computation operations are repeated for each of the remaining properties, and the property that yields the minimum expected number of subsequent queries is selected for use in the initial system query.

In accordance with another aspect of the invention, the frame properties may be separated into static properties and dynamic properties, where static properties are defined as part of an application running on the processing system, and dynamic properties are those properties that are determined based on a current context of the dialogue. Static properties may include, for example, approximate properties and properties that are computationally inexpensive to retrieve from the application. Dynamic properties may include properties that are bound in the context of a user request, properties that are requested by the user, and any other properties that are not static. The static and dynamic properties are further separated into a number of different classes, based on logic functions or other combinations of different sets of the static and dynamic properties. The class of a given property may then be used in conjunction with its weight to determine its relative importance and therefore an appropriate response to a user input. In some applications, the weight associated with a property provides a good global measure of the importance of the property but may not capture its "local" importance, where local importance of a property refers to its importance in the current context of the dialogue. Membership in a particular class based on a function of the above-noted static and dynamic property grouping provides an effective way of combining the local and global importance of a property.

The present invention utilizes an approach to dialogue management which is object-oriented and rule-based, and is suitable for use in question-answer systems, spoken input systems, variable initiative systems, as well as other types of dialogue processing systems. The approach of the present invention is scalable and therefore simplifies application development. Information about each part of a particular dialogue processing application can be encapsulated, and is therefore easy to augment, define and redefine as the need arises. Moreover, the application-independent objects comprising the dialogue manager eliminate the need for an application developer to manually define the dialogue states and their interconnections. The invention may be implemented in numerous and diverse dialogue processing applications, and considerably simplifies the development of such applications. These and other features and advantages of the present invention will become more apparent from the accompanying drawings and the following detailed description.

DETAILED DESCRIPTION OF THE INVENTION

The present invention will be illustrated below in conjunction with an exemplary dialogue processing system. It should be understood, however, that the disclosed techniques are suitable for use with a wide variety of other systems and in numerous alternative applications. For example, although illustrated using a system which conducts a spoken dialogue with a user, the invention is also suitable for use with non-spoken dialogues, such as dialogues in which a user types responses to system questions on a keyboard. The term "dialogue" as used herein refers generally to a conversation-like exchange involving two or more participants. An "agent" refers generally to a particular dialogue participant. The term "initiative" refers generally to a particular type of role which an agent can take on in a dialogue.

Figure 1:
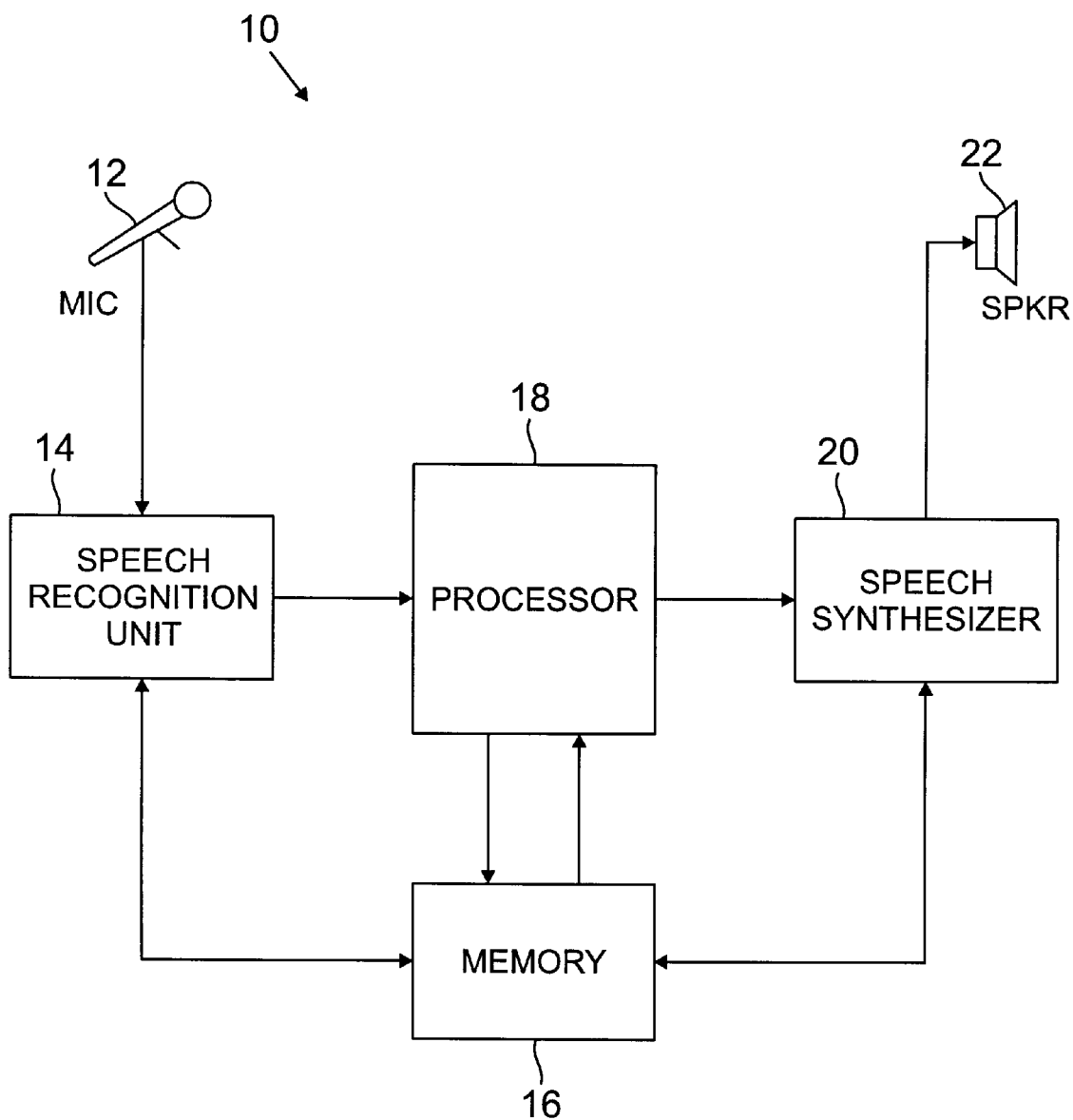
FIG. 1 shows an exemplary dialogue processing system in which the dialogue management techniques of the present invention may be incorporated.

FIG. 1 shows an exemplary dialogue processing system 10 in which dialogue management techniques in accordance with the present invention may be implemented. The processing system 10 is configured to provide interaction between a computer or other processor and one or more human users. Both the computer and the human users are referred to herein as agents. The system 10 receives a speech signal in the form of utterances from a user via a microphone 12. A speech recognition unit 14 converts the speech signal to a computer-recognizable format, utilizing keyword templates or other information stored in a system memory 16. The converted speech signal is then supplied to a processor 18 for processing in accordance with dialogue processing techniques to be described in greater detail below. The processor 18 generates an output speech signal by supplying appropriate drive signals to a speech synthesizer 20. Both the processor 18 and the speech synthesizer 20 may make use of information stored in system memory 16. The output speech signal is supplied from speech synthesizer 20 to a speaker 22 for delivery in an audibly perceptible form to the user.

The present invention may be implemented in the form of a computer software program stored in memory 16. As will be described in greater detail below, the software program provides a set of dialogue management techniques, and may be referred to generally herein as a dialogue manager. The dialogue manager program may be executed by processor 18 in accordance with user-supplied input speech signals to produce a desired collaborative dialogue suitable for solving a particular problem in a given application. The various elements of processing system 10 may represent hardware and/or software elements of a personal computer, mainframe computer, microcomputer, workstation, telephone call handling system, ATM or any other system in which human-machine interaction is implemented in the form of a collaborative dialogue. Although the system 10 of FIG. 1 is configured to process speech signals, alternative embodiments of the invention may utilize other types of input and output devices, such as a keyboard and a display monitor, respectively, to allow the system to conduct a non-spoken dialogue with a user. For example, the user portions of a dialogue may be entered into the system by the user via the keyboard, and the system responses may be displayed, with or without the corresponding user portions, on the display monitor.

The present invention provides dialogue management techniques which allow a dialogue processing system such as system 10 of FIG. 1 to conduct an intelligent dialogue with a human user. The dialogue management techniques implement a set of general dialogue principles which may be used to characterize dialogues in a wide variety of practical applications, including question-answer systems, spoken input systems and variable initiative systems. An exemplary embodiment of the invention utilizes the following set of five general dialogue principles: disambiguation, relaxation, confirmation, completion, and initiative taking. The system is configured to include a set of objects to provide appropriate processing to implement each of these dialogue principles. The generality of these principles facilitates the use of the system in a wide variety of different dialogue processing applications. Other embodiments of the invention may utilize a subset of these general dialogue principles, as well as other dialogue principles not specifically noted. An exemplary set of objects for providing dialogue management in accordance with the invention will be described in greater detail in conjunction with FIG. 6 below.

As noted above, the present invention utilizes an approach to dialogue management which is object-oriented and rule-based. Unlike conventional finite-state or directed graph approaches, the approach of the present invention is scalable and therefore considerably simplifies application development. For example, information about each part of a particular dialogue processing application can be encapsulated, and is therefore easy to augment, define and redefine as the need arises. Moreover, the set of objects comprising the dialogue manager eliminates the need for an application developer to manually define all the dialogue states and their interconnections, which considerably simplifies the development process for applications which may be run using the dialogue processing system.

The invention may be configured to utilize a number of dialogue motivators, each of which may be viewed as a reason for conducting a dialogue. Exemplary motivators include: (1) queries generated by missing required information; (2) relaxation; (3) confirmation; (4) disambiguation of user inputs; (5) description of otherwise invisible semantic actions; (6) augmentation; and (7) detection of user confusion/error correction. The following are examples of dialogues illustrating each of the above motivators. Statements appearing in italics are from a user and those in boldface are generated by the processing system.

1. Missing Information. Missing information refers generally to pieces of information that the dialogue manager must know about in order to process a user request.

*I would like to travel from Newark to Miami tomorrow.*
At what time?
*In the morning.*
First class, business, or coach?

In this example, the time of flight and the type of seating is required to make a reservation and therefore must be asked before searching for a flight.

2. Relaxation. Relaxation refers generally to the ability of the system to drop certain constraints that caused it to not be able to process a user request.

*I would like to travel first class from Newark to Miami tomorrow before 10AM.*
There are no such flights. However, there are two flights that are not first class. Would you like me to list them?
*Yes.*
The departure times are 8:00 and 9:00.

This user request was too restrictive and hence could not be fulfilled. The request must then be relaxed in order to find a flight. Offering a choice of business, coach or a flight after 10AM allows the collection of additional information that may make it possible to reserve a flight.

3. Confirmation. Confirmation may be used when a user request could not be carried out. For example, the system may elect to confirm the value of a property to ensure that it understood it correctly.

What is your id?
*6473.*

Upon not finding an id with the value 6473 the system will ask:

Is 6473 your id?

4. Disambiguation. Disambiguation occurs if the system determines that something the user has said can be confused with something else that it knows about or if it can not execute the task in a unique manner.

*Was Amadeus nominated for an academy award?*
Is Amadeus the movie's title?
*No.*

The ambiguity in this example arises from the fact that Amadeus may be both the name of a movie and the name of a person, and the system therefore must distinguish between the two.

5. Invisible semantic actions. The dialogue system should alert the user to invisible semantic actions, which are implicit actions that may occur because of a constraint imposed by the user.

*I would like a round trip ticket from Newark to San Francisco leaving tomorrow before 10AM.*
First class, business, or coach?
*Coach.*
Returning when?
*Next Friday after 6PM*
The only flight returning next Friday is a first class flight. Is this OK?

Making sure that the user knows that the return flight is not coach ensures that the reservation conforms to the user request. Confirming whether or not the request is correct in this case is an example of an otherwise invisible semantic action.

6. Augmentation. Augmentation is the opposite of relaxation. An under-constrained request may require augmenting the information that the dialogue system possesses in order to select among several possible solutions to the request.

Was Amadeus nominated for an academy award?

Is Amadeus the movie's title?

No.

There are several people with the name Amadeus. What is Amadeus' occupation?

Composer.

In this example there was not enough information to answer the initial question. The problem is that there is more than one person with the name Amadeus, and therefore the system must gather more information about which Amadeus the user is referring to.

7. User Confusion/Error Correction. If the user does not know how to answer a question the system must be able to ask another question in the hopes of executing the user request. One indication that the user is confused is if he/she answers a question with "I don't know" or something similar. Another indication of user confusion may be a lack of progress, that is, an indication that the system is having difficulties extracting a correct piece of information from the user.

Was Amadeus nominated for an academy award?

Is Amadeus the movie's title?

No.

There are several people with the name Amadeus. What is Amadeus' occupation?

I don't know.

What is Amadeus' full name?

Wolfgang Amadeus Mozart.

This example resembles the previous one with the exception that the user when asked does not know Amadeus' occupation. In this case another property of Amadeus must be found that may be used to distinguish among the several people with the name Amadeus.

The operation of the above-noted dialogue manager will now be described in greater detail. The dialogue manager operates so as to direct a dialogue with a user in an attempt to satisfy a user request. The user request may be a request for a particular piece of information from a database (e.g., availability of a flight or car), a command (e.g., to have a robot move an object to a desired location), or any other type of request. Irrespective of the particular task, the dialogue manager is configured to recognize the user request, determine when to initiate a dialogue, and decide what to ask the user so as to process the user request efficiently.

Figure 2:
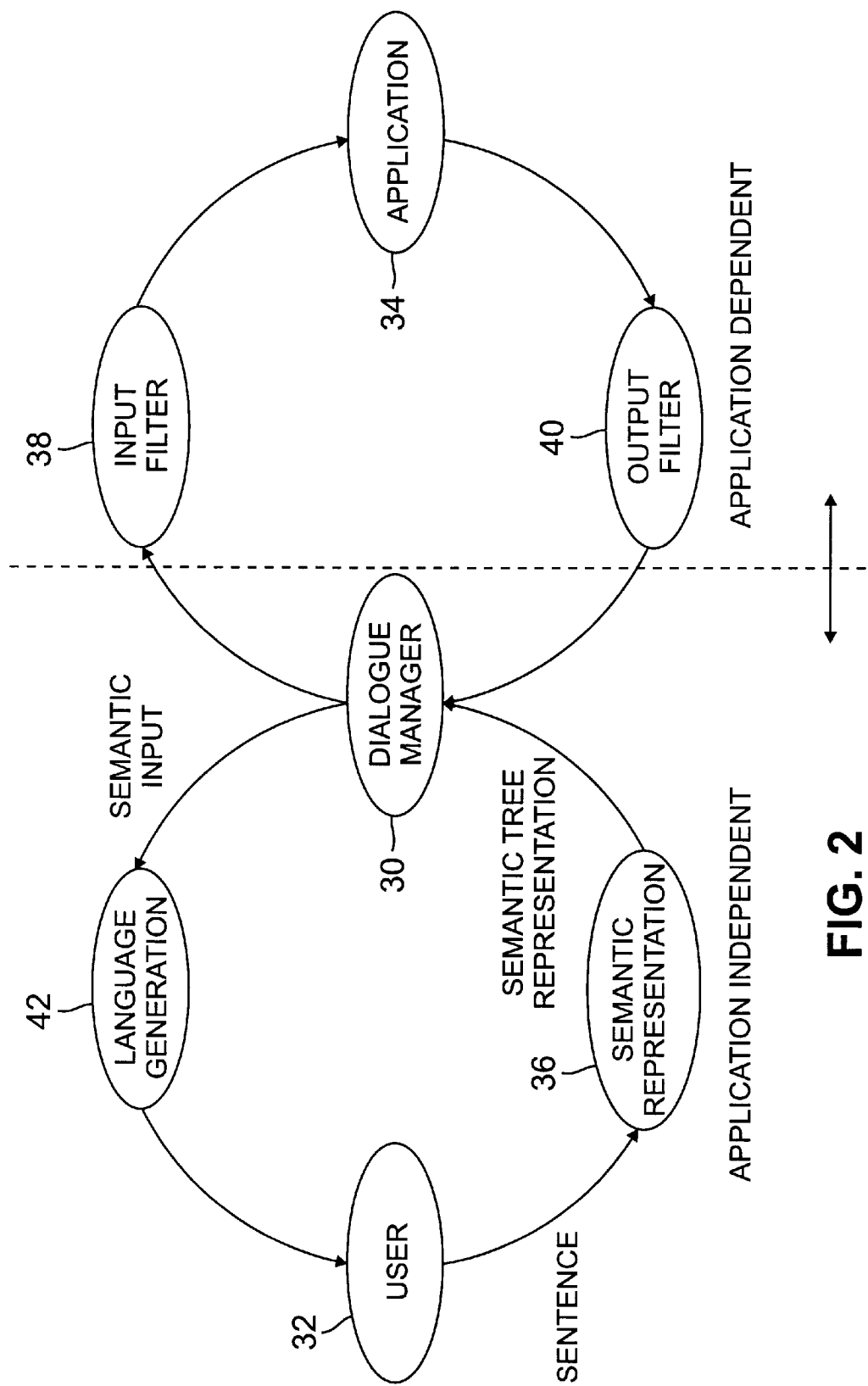
FIG. 2 illustrates the interaction between a dialogue manager, a user and an application in accordance with one embodiment of the invention.

FIG. 2 illustrates in greater detail the operation of a dialogue processing system such as system 10 of FIG. 1 in accordance with the invention. The FIG. 2 diagram shows the flow of control between a dialogue manager 30, a human user 32 and an application 34. The dialogue manager 30 and application 34 are generally implemented in software run by processor 18 and stored in memory 16. The dialogue management process in this example begins when the user says something, either in response to an initial question posed by the system or as an initial user request. The user input in this embodiment thus comes into the system in the form of a sentence or other utterance. The meaning of the utterance is then extracted and placed in a semantic tree representation 36. The dialogue manager 30 uses the tree representation 36 to determine if it should execute one of a number of dialogue motivating algorithms based on the above-described motivators. These algorithms may each involve a number of different processing operations, such as, for example, directing one or more questions to the user, supplying user input to the application, and transmitting responses from the application to the user.

If the dialogue manager 30 determines that it needs to ask the user a question, it calls a natural language generation element 42 which outputs the question in a user-perceptible form. If the dialogue manager 30 determines that the user request is unambiguous and does not lack information, it supplies the semantic tree representation 36 to an input filter 38 which serves as an interface between the dialogue manager 30 and the application 34. The input filter 38 extracts the needed information from the semantic tree representation 36 and puts it in a format suitable for processing by the application 34. The application 34 then executes the request and sends back an appropriate response that is formatted by an output filter 40 and delivered to the dialogue manager 30. The dialogue manager 30 determines if the result of executing the user request led to any ambiguities in the application 34, in which case the process may be repeated to clarify the ambiguity. If the dialogue manager 30 determines that the application 34 did not find any ambiguities in the request, then the response generated by application 34 is presented to the user via the language generation element 42.

In posing a question to the user, the dialogue manager generally should be configured to select those questions that are meaningful, efficient, and computationally inexpensive. For a question to be meaningful it should be related to what the user wants. Efficiency generally means arriving at an appropriate request by asking the fewest number of questions. A computationally inexpensive question may involve, for example, a request for a piece of information that can easily be retrieved from a database, or a command that can easily be carried out. In certain embodiments of the invention, determining a computationally inexpensive question may be a responsibility assigned to the application 34.

The dialogue manager 30 includes a set of objects for handling the various dialogue principles noted previously. In accordance with the invention, the configuration of these objects is generally unaffected by the particular application 34. Application independence and scalability are important advantages of the object-oriented and rule-based dialogue management of the present invention. Although the dialogue manager 30 may be implemented using a finite-state approach, which generally requires definition of all possible dialogue states and their interconnections, such an approach will often be unduly complex for large-scale applications. The illustrative embodiment of the invention described herein instead relies on the dialogue manager 30 to determine which dialogue principles to apply and when to apply them. This feature eliminates the need to predict all possible dialogue states and their interconnections, and thus considerably simplifies application development.

A summary of the underlying representations used by the illustrative dialogue manager 30 will now be provided. These representations include a grammar, frames, and interpretation trees. The first step in conducting an intelligent dialogue is to understand what the other participant has said. In order to enable the processing system to do this, the dialogue manager 30 is supplied with a grammar that will enable it to parse a variety of queries and requests. The grammar may be written in a high-level language such as Grammar Specification Language (GSL), as described in M. K. Brown and B. M. Buntschuh, "A New Grammar Compiler for Connected Speech Recognition," Proceedings of ICSLP94, September 1994, which is incorporated by reference herein. The grammar of the dialogue manager 30 may also include a semantics capability, such that the semantics may be used to build a proper interpretation tree for a given user request.

Figure 3:
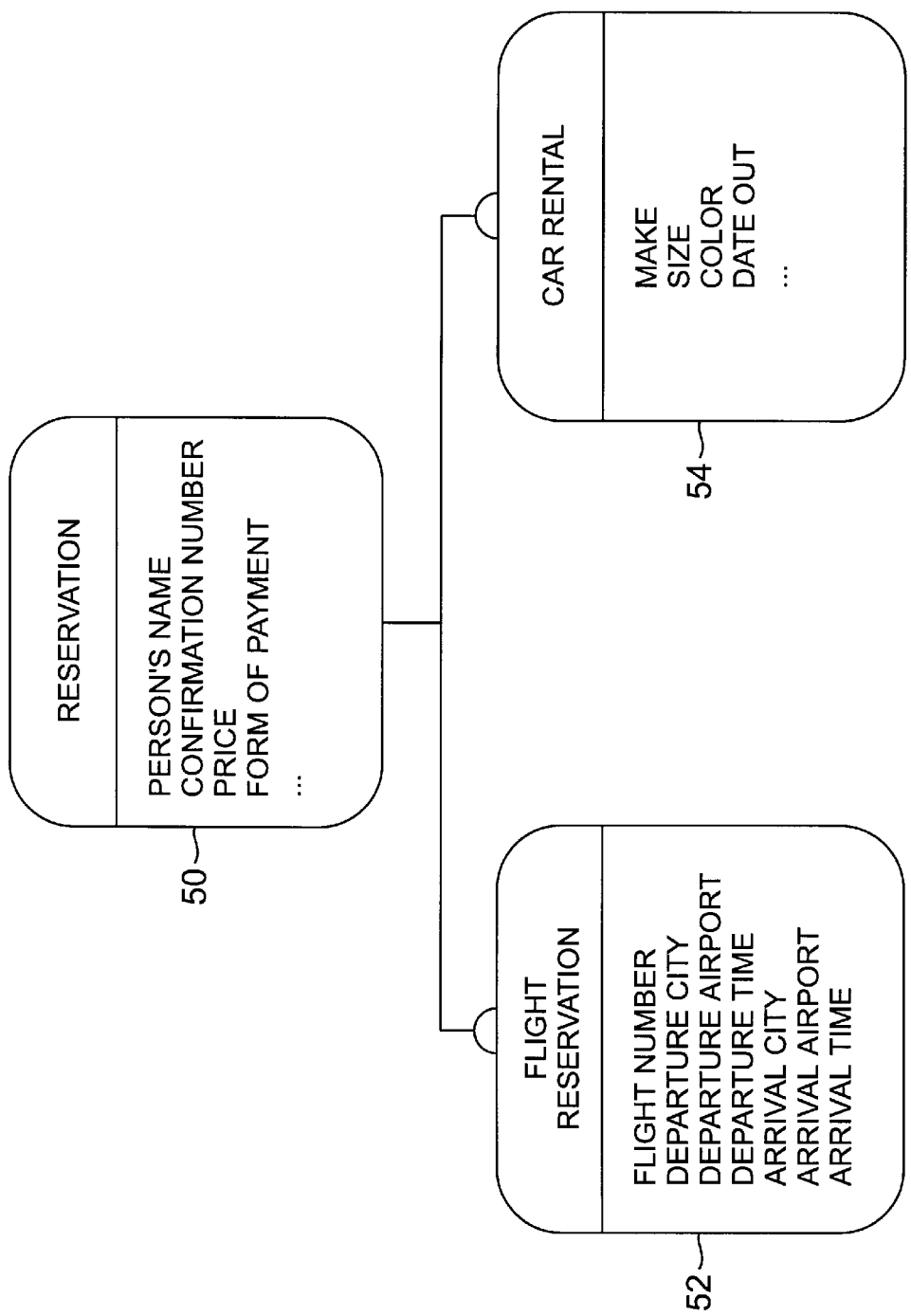
FIG. 3 shows the relationship between different frames in an illustrative embodiment of the invention suitable for use in a travel reservation application.

FIG. 3 shows a hierarchy of frames that may be used to represent the concept of a reservation in a dialogue processing application for making travel arrangements. A frame refers generally to a collection of properties that describes an object or concept. For example, a person may be an object, a name may be a property of that object and a particular name John Smith may be the value of a property. The FIG. 3 example includes a frame 50 denoted "Reservation," a frame 52 denoted "Flight Reservation," and a frame 54 denoted "Car Rental." Frames may inherit properties from other frames. In the FIG. 3 example, the frames 52 and 54 may each inherit properties, such as "Person's Name," and "Form of Payment," from the general "reservation" frame 50. In accordance with the invention, each of the properties of a given frame is assigned a weight, such that the weight conveys to the dialogue manager 30 the importance of the corresponding property. For example, a higher weight may indicate a more important property. The set of weights is used by the dialogue manager 30 when it formulates its queries to a user. That is, the dialogue manager 30 may decide to ask the user about the property which has the highest weight since this is a relatively important property. As is apparent from the FIG. 3 example, the definition of the frames is generally specific to the application 34.

Figure 4:
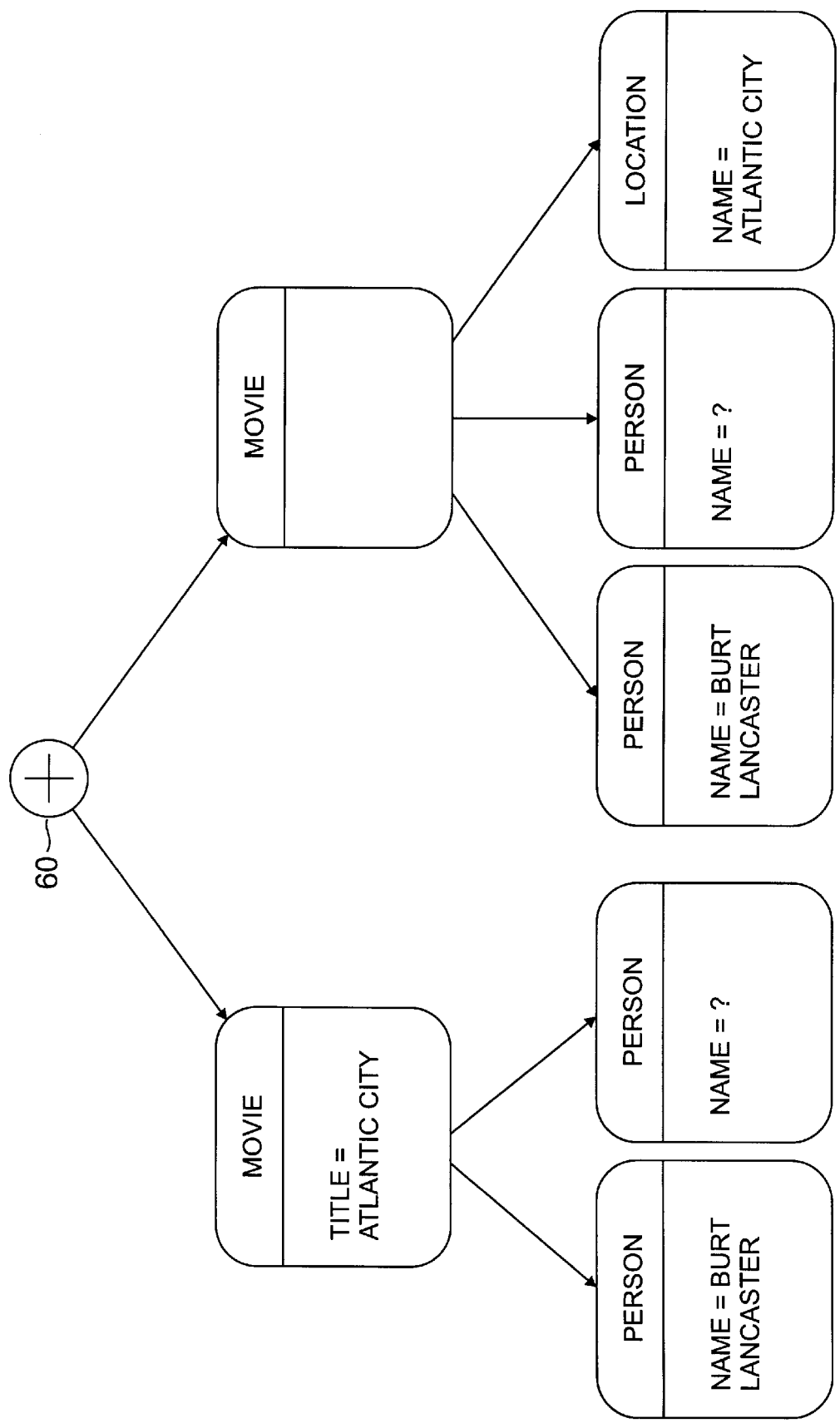
FIGS. 4 and 5 show interpretation trees which may be generated by a dialogue manager in accordance with the invention.
Figure 5:
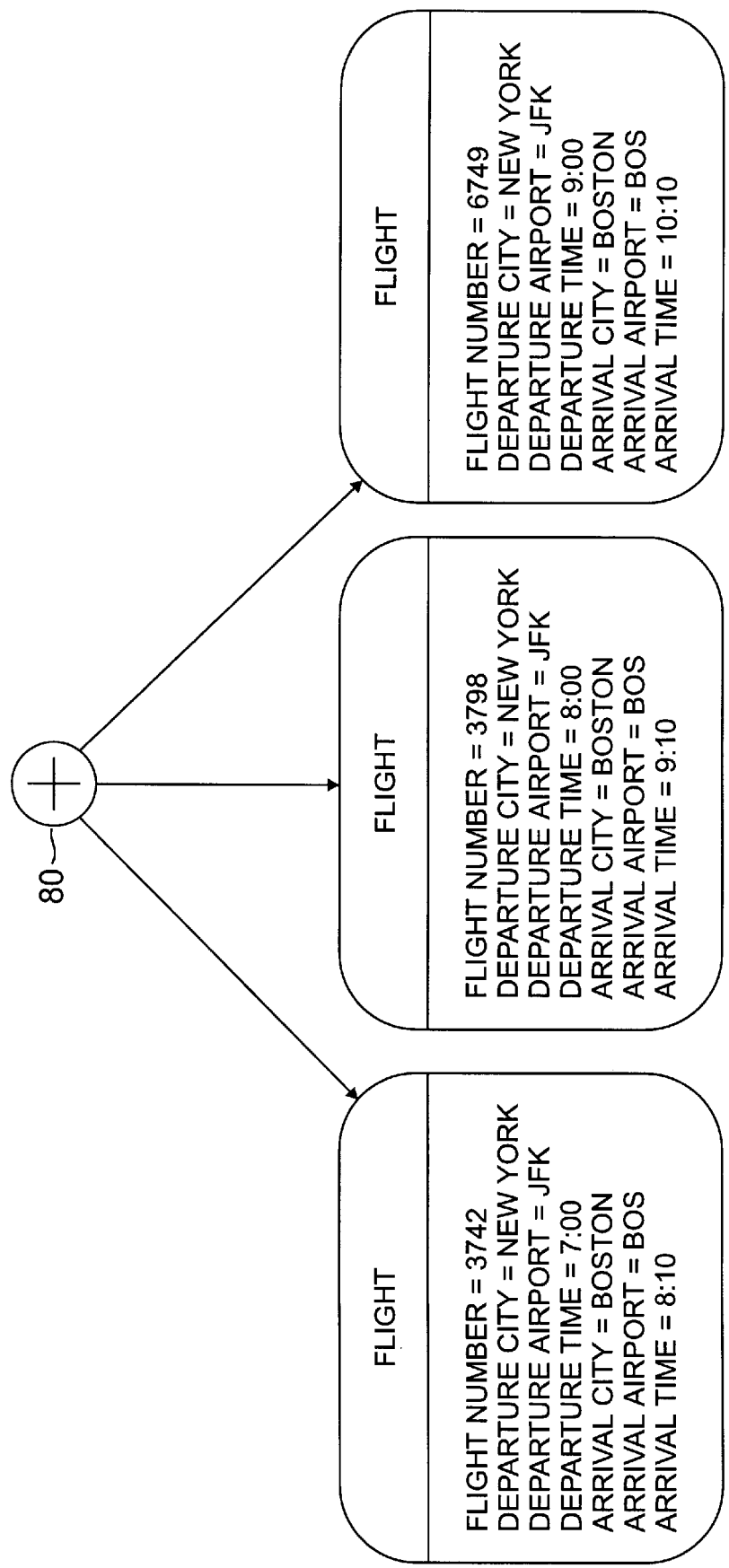

FIGS. 4 and 5 show exemplary interpretation trees which may be constructed by the dialogue manager 30 in two different applications of the invention. The above-described grammar assists the dialogue manager 30 in building a tree structure that represents an interpretation of a user utterance. In constructing the interpretation tree, the dialogue manager 30 may find two or more possible meanings for a given user utterance. If this is the case, the dialogue manager creates an interpretation tree with the same number of branches as possible interpretations for the utterance and then attempts to disambiguate it. There are generally at least two situations that lead to disambiguation. The first situation occurs when the user has said something that is ambiguous. This situation is illustrated in the interpretation tree of FIG. 4, which is generated by the dialogue manager 30 in order to interpret the user sentence "Who starred with Burt Lancaster in Atlantic City?" The ambiguity is represented by the "+" node 60. In this example, the ambiguity exists because there are two different interpretations for the phrase "in Atlantic City." The sentence may be referring to the location in which the movie was filmed or it may be referring to the movie title. The dialogue manager 30 traverses a given interpretation tree looking for "+" nodes indicative of ambiguity. When it finds a "+" node, the dialogue manager 30 directs one or more questions to the user in order to clarify the ambiguity. In the FIG. 4 example, the ambiguity corresponding to node 60 may be resolved by the dialogue manager 30 directing the following question to the user: Is Atlantic City the movie's title?" The dialogue manager generally thus clarifies each higher level ambiguity before searching deeper into the interpretation tree looking for other ambiguities. The dialogue manager formulates its questions based on the frames, the properties associated with the frames, and the weights assigned to the properties.

The second of the two situations leading to disambiguation occurs when there are too many responses from the application 34. This situation is illustrated in the interpretation tree of FIG. 5. In this example, a user has requested the system to reserve a flight from New York to Boston departing in the morning, and the ambiguity arises because the application 34 has returned three such flights. This ambiguity is indicated by "+" node 80. If either one of the two situations illustrated in FIGS. 4 or 5 occurs, the dialogue manager 30 should be able to select an appropriate question to ask the user in the hopes that an answer to that question will resolve the ambiguity. It should be noted that the question that the dialogue manager 30 selects to ask first can affect the number of questions that it will have to ask to resolve the ambiguity. In order to avoid tedium for the user, it is generally important that the dialog manager 30 resolve the ambiguity using the fewest number of questions.

The following example will serve to illustrate the question selection process in dialogue manager 30. Assume the dialogue manager 30 has detected an ambiguity and that the corresponding interpretation tree includes five branches, B1 through B5, and three properties that the dialogue manager 30 can ask the user about in order to resolve the ambiguity. The frames are representative of a flight reservation application and the three properties include the departure city (DepCity), the arrival city (ArrCity) and the departure time (DepTime). TABLE 1 below shows the values of the properties for each of the five branches of the interpretation tree. It will be assumed for simplicity of illustration that the outcome of the selection process is equiprobable.

TABLE 1

|  | B1 | B2 | B3 | B4 | B5 |
| --- | --- | --- | --- | --- | --- |
| DepCity | Boston | Boston | Washington | New York | Washington |
| ArrCity | Washington | New York | New York | Washington | New York |
| DepTime | 9:00 | 9:00 | 11:30 | 11:30 | 9:00 |

If the dialogue manager were to ask the user about the departure city first, then the user may respond with either Boston, Washington, or New York. To satisfy the above-noted equiprobability of outcomes, there is a 40% probability that the user will say Boston, a 40% probability that the user will say Washington and a 20% probability that the user will say New York. If the user responds with Boston, then the dialogue manager must discriminate between the branches B1 and B2. If the user responds with Washington, then the dialogue manager must distinguish between the branches B3 and B5. However, if the user responds with New York, then the dialogue manager does not need to ask any further questions because this response narrows the search for the correct branch to one, namely branch B4. It is therefore apparent that asking a question reduces the number of branches contributing to the ambiguity. If the user responds with Boston as the departure city, then the dialogue manager should choose to ask next about the arrival city rather than the departure time because a response to the question about the arrival city will single out a branch, while a response to departure time will not because both flights in branches B1 and B2 have a departure time of 9:00. Similarly, if the user responds with Washington as the departure city, then the dialogue manager should ask next about the departure time because the arrival city in branches B3 and B5 is the same and hence it would not be able to distinguish between the two flights.

As noted above, the total number of questions required to resolve an ambiguity is typically a function of the order in which the questions are asked. In the TABLE 1 example, the total expected number of questions if the dialogue manager chooses to ask about the departure city first is 1.8. This value is computed based on the probabilities of the responses. In this situation, the dialogue manager must ask at least one question. After asking the first question, there is a 40% probability that it will have to ask a second question should the user respond with Boston, plus a 40% probability that it will have to ask a second question if the user responds with Washington, plus 0 if the user responds with New York since this selects one branch. The total expected number of questions is therefore (1+0.4+0.4) or 1.8. Had the dialogue manager chosen to ask about the arrival city first, instead of the departure city, the total expected number of questions would be 2.4. The reason for this is that there is a high probability that the user will respond with New York to the question of arrival city. If this is the case, then the dialogue manager may have to ask as many as two more questions. If the user responds with New York when asked for the arrival city, then there is a 67% probability that the user will respond with Washington when asked for the departure city, which would mean asking yet another question, namely the departure time, before being able to distinguish among all five branches. The total expected number of questions is therefore (1+0.4+0.6*(1+0.67)) or 2.4.

The foregoing example indicates how the selection of the property for the initial query can affect the number of subsequent queries required to resolve an ambiguity. A dialogue manager in accordance with the present invention may therefore determine an appropriate property for an initial query by computing the total expected number of subsequent queries for each property. The following notation will be used in illustrating this computation:

B: a set of branches in an interpretation tree
p: a frame property
P: a set of frame properties
w: a weight associated with a property, w>=1
V: a set of different values of property p in branch B
S: a set of instances that have a given value for a given property
$\|S(v, p, B)\|/\|B\|$: probability that branch B has value v for property p.

The dialogue manager uses the following recursive equation to compute the minimum expected number of questions N(P, B) for a given set of properties P and branches B:

$$N(B, P) = \min_{p \in P} \left\{ \frac{1}{w} + \sum_{v \in V(p,B)} \frac{\|S(v, p, B)\|}{\|B\|} \times N(S(v, p, B), P\backslash\{p\}) \right\}$$

where '\' is a negation operator. The dialogue manager initially chooses a property p∈P as the first property and recursively calls the above equation on the remaining properties in order to compute the total expected number of questions given that property p is the property the user is asked about first. The dialogue manager similarly computes the expected total expected number of questions for all properties p∈P, and then chooses the property p that yields the minimum expected number of questions. It then formulates a question regarding the property p and directs the question to the user, such that the ambiguity may be resolved in a minimal number of questions.

As noted previously, properties are assigned a weight in order to quantify their relative importance, with a larger weight generally indicating a more important property. In addition, properties may also be assigned a state, which may be either static or dynamic. Static properties are those properties that are defined as part of the application definition. Such properties may be either approximate properties, such as a portion of a person's name, or properties that are computationally inexpensive to retrieve from the application. The approximate static properties will be designated $S_1$, the computationally inexpensive static properties will be designated $S_2$ and all other static properties will be designated S. Dynamic properties are those that are determined based on the current context of the dialogue, and include those properties bound in the context of the request, properties requested by the user, and all other properties that are not static. These sets of dynamic properties are designated $D_1$, $D_2$, and D, respectively.

The above-described sets $S_1$, $S_2$, S, $D_1$, $D_2$ and D, combined and intersected, form four distinct classes $C_1$, $C_2$, $C_3$ and $C_4$ that provide a useful measure of the overall importance of a particular property in a current dialogue context. Properties that fall into the first class $C_1$ are the most attractive properties to use when the dialogue manager needs to formulate a query. The class $C_1$ is defined as $(S\backslash S_1) \cap S_2 \cap D$, and includes those properties that are exact, inexpensive, and not bound. This set is generally the most attractive because exact properties are more likely to be stated without ambiguity. An inexpensive property has the advantage of being easy to retrieve from the application, and asking about an unbound property ensures that the question formulated is intuitive. The second class $C_2$ is defined as $S_1 \cap D_1$, and includes those properties that are approximate and bound. Even though this class consists of properties that are bound it also refers to those that are approximate and hence may require clarification. The third class $C_3$ is defined as $S_1 \cap S_2 \cap D$, and includes those properties that are approximate, inexpensive and not bound. This set gets third priority primarily because it refers to properties that are not bound and approximate, and therefore have a higher probability of leading to ambiguities. The fourth class $C_4$ is defined as $S\backslash(C_1 \cup C_2 \cup C_3)$, and includes all other properties. It is the least attractive of the four classes of properties. TABLE 2 below summarizes the four classes of properties.

TABLE 2

| Class | Definition | Description |
|---|---|---|
| $C_1$ | $(S\backslash S_1)\cap S_2 \cap D$ | exact (i.e., not approximate), inexpensive, not bound |
| $C_2$ | $S_1 \cap D_1$ | approximate, bound |
| $C_3$ | $S_1 \cap S_2 \cap D$ | approximate, inexpensive, not bound |
| $C_4$ | $S\backslash(C_1 \cup C_2 \cup C_3)$ | all other |

In the above recursive equation, 1/w was added to the sum to account for the initial question and the weight associated with the property being asked about. The weight associated with a property is generally a global measure of its importance but may not capture its local importance, where local importance of a property refers to its importance in the current context of the dialogue. Membership in one of the classes $C_1$, $C_2$, $C_3$ or $C_4$ provides a way of combining the local and global importance of a property. This may be done by defining the weight in the recursive equation to be $w=w_p+w_c$, where $w_p$ is the weight associated with a property and $w_c$ is the weight associated with a class.

As noted above, when faced with an ambiguity the dialogue manager solicits pieces of information from the user in its attempts to clarify the ambiguity. The dialogue manager can accomplish this by asking the user a series of questions. The dialogue manager utilizes the user's response to these questions to select a particular branch from the corresponding interpretation tree. This disambiguation process is referred to herein as "collapsing." When the dialogue manager presents the user with a query, the dialogue manager may create an expectation tree to serve as a depository for the user's response. The expectation tree, like the previously-described interpretation tree, includes nodes that represent instances of frames. When the dialogue manager has decided what property to ask the user about, it forms an instance of the appropriate frame. For example, if the dialogue manager asks:

What city does the flight depart from?

it creates a flight instance and marks the departure city as the property for which a response is expected from the user.

The following example will illustrate the collapsing process in greater detail. Assume that a user has asked to reserve a flight from New York to Boston departing in the morning, and that the application has returned three such flights. FIG. 5 shows the corresponding interpretation tree. The above-described question selection policy implemented by the dialogue manager returns the departure time as the property it should ask the user to clarify since this property differs among the three flights and it is a property which is relatively important from the standpoint of reserving a flight, certainly more so than, for example, the aircraft. The dialogue manager responds with:

There are 3 flights. The departure times are 7:00, 8:00, and 9:00. Please select one.

At this point the dialogue manager creates an expectation tree which includes a flight instance whose departure time is marked as being the property the user is expected to fill in as a result of the dialogue manager's question. Assume that the user selects 8:00 as the departure time. The dialogue manager proceeds to collapse the expectation tree and the ambiguous interpretation tree of FIG. 5 that contains the three flights. The collapsing process may involve the dialogue manager performing a pattern match between the properties of the expectation tree and the ambiguous interpretation tree. It will then select the branch of the interpretation tree whose departure time is 8:00 since this matches the departure time in the expectation tree. If the user says something that the dialogue manager is not expecting in its expectation tree, then the dialogue manager will confirm what the user has said. If what the user said is confirmed, then the dialogue manager will proceed to ask another question in an attempt to clarify the ambiguity. If the dialogue manager runs out of questions, it notifies the user that the system can not carry out the request.

There may be occasions when, even with an unambiguous interpretation tree and no missing information, the dialogue manager may not be able to fulfill a user request without further intervention. When this situation arises, the dialogue manager may perform either a confirmation or a relaxation process. As noted above, confirmation generally involves verifying the value of certain properties associated with the request, while relaxation generally involves dropping certain properties associated with the request. Before relaxing a constraint the dialogue manager may choose to confirm the value of a particular property. The dialogue manager usually first chooses to confirm those properties that are approximate, because these properties have a higher probability of being incorrectly spoken or incorrectly recognized. If confirming a property results in the realization that the value is correct, then the dialogue manager proceeds to relax a constraint. If confirming a property results in the realization that the value is incorrect, then the user is prompted for the value of that property again, and the dialogue process is repeated. An important issue with relaxing constraints is knowing which constraints to relax. For example, the dialogue manager should not drop any required properties since these are vital to fulfilling the user request. It may instead begin by dropping those constraints that have low weights. If this results in retrieving certain data relevant to the request, then that data is presented to the user. If the dialogue manager runs out of properties it can drop, then it may choose to confirm those properties that have high weights.

The dialogue manager implements the above-noted completion process by querying the user for any missing required information. The dialogue manager determines that there is missing required information by examining the weights associated with the properties of those frames that have been instantiated. If there are one or more properties lacking a value, and these properties have weights which are sufficiently high, then the dialogue manager may query the user for the missing values.

The performance of a dialogue processing system using the above-described dialogue management will be further illustrated below in the context of a flight reservation system. The goal of this exemplary flight reservation system is to reserve flights for airline employees. In this application, the dialogue manager is supplied with a particular scenario. The scenario provides the dialogue manager with the information it needs to understand and execute a user request. Again, the statements in italics are from a user and those in boldface are from the system. The illustrative flight reservation dialogue begins as follows:

Welcome to the flight reservation system. What is your ID?

*456.*

If the user ID is not found, the dialogue manager will confirm the ID as follows.

Is 456 your id?

*Yes.*

Since the dialogue manager understood the correct ID, it will try to ask the user another question, such as:

What is your last name?

*Brown.*

The dialogue manager then seeks information from an application database regarding an employee whose last name is Brown. In this example it will be assumed that the dialogue manager retrieves information on two people whose last name is Brown. This causes the dialogue manager to apply the above-described disambiguation process and the dialogue manager asks:

What is your first name?

*Mike.*

Had there only been one Brown, then the dialogue manager would not have asked about the first name. But since there was more than one person with the name Brown, the dialogue manager needed to clarify which Brown the user was referring to. The dialogue manager did not ask about the ID number again because it had already confirmed the number after failing to locate it in the database. The dialogue manager distinguished between the two people whose last name was Brown by asking the user's first name, as shown above. It should be noted that the dialogue manager did not initially ask for the user's first name, which would have meant asking one fewer question in this example, because the caller's last name had a higher weight associated with it, and was therefore determined to be of greater importance.

If the above example is altered such that the user not known their ID to begin with, the dialogue might have proceeded as follows:

What is your id?

I don't know.

Then the dialogue manager would have asked:

What is your last name?

Brown.

Once it has verified the user's identification, it proceeds to determine further instructions and asks:

What is your departure city?

New York.

What is your expected time of departure?

In the morning.

What is your destination?

Boston.

Once it has this information it submits the request to the application. For this particular example, the application returns two flights departing from New York in the morning and arriving in Boston. Therefore it generates the following statement:

There are two such flights. The departure times are 8:00 and 9:00. Please choose one.

8:00

The dialogue manager may list a number of possible selections to choose from. Should there be a large number of selections available it may say:

There are many flights. Please more accurately specify the departure time.

The dialogue manager chooses to ask about the departure time because it differs between the two flights and because it has a high weight, meaning that it is an important property and likely to aid in the disambiguation process. The above example dialogue represents a form-filling dialogue where the system has all the initiative and asks the user a series of questions to solicit a single piece of information. The invention is of course applicable to many other types of dialogues, including dialogues which are more flexible and allow the user to take more of an initiative.

Figure 6:
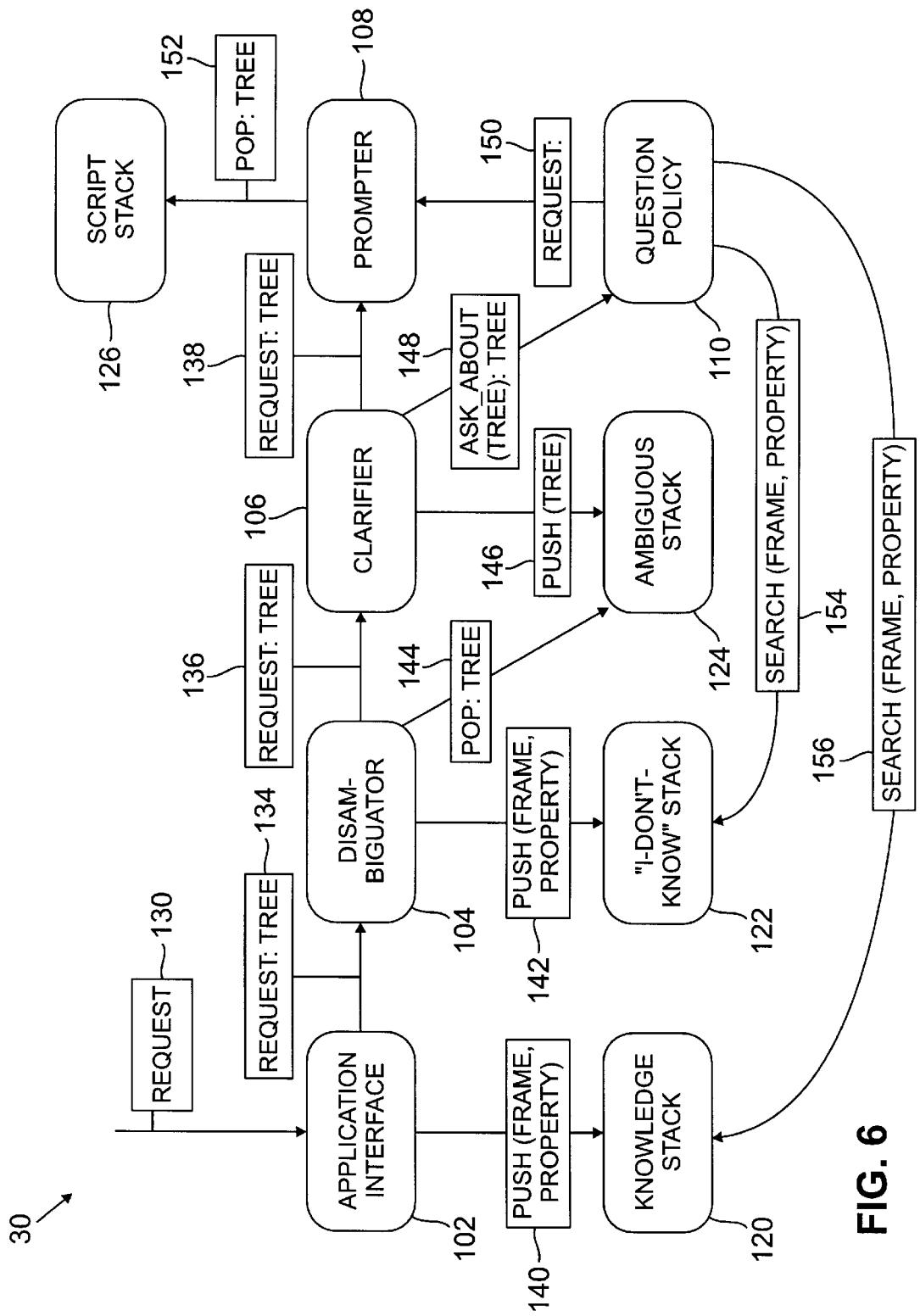
FIG. 6 is a block diagram illustrating the operation of an exemplary dialogue manager which may be implemented in the dialogue processing system of FIG. 1.

FIG. 6 illustrates an exemplary embodiment of the dialogue manager 30 in accordance with the invention. As previously noted, the dialogue manager 30 may be implemented in software executed by processor 18 of the dialogue processing system 10 of FIG. 1. The dialogue manager 30 includes a number of different objects, each of which is responsible for a portion of the dialogue management process. The objects of the dialogue manager 30 in this example include an application interface 102, a disambiguator 104, a clarifier 106, a prompter 108, a question selection policy 110, a knowledge stack 120, and "I don't know" stack 122, an ambiguous stack 124, and a script stack 126. These objects interact by sending messages to each other either requesting data or supplying data, as illustrated in FIG. 6. The interaction between the objects is governed by a set of rules based on the previously-noted dialogue principles. The dialogue manager processes a dialogue in the form of the previously-described interpretation trees. The references to "tree" in FIG. 6 refer to an interpretation tree generated for a particular portion of a dialogue being processed by the dialogue manager 30. The various objects of the dialogue manager 30 perform operations, such as request operations 130, 134, 136, 138 and 150, push operations 140, 142 and 146, pop operations 144 and 152, ask_about operation 148, and search operations 154 and 156, on the interpretation trees or portions thereof.

The knowledge stack 120 contains the interpretation trees that represent the knowledge the user has provided the dialogue manager, either in the form of an initial request or as a result of responding to questions from the dialogue manager. The application interface 102 directs interpretation trees to the knowledge stack 120 using the push operation 140. The knowledge stack 120 is also used by the question selection policy 110, as indicated by the search operation 156. The dialogue manager may search the knowledge stack 120 before asking a given question, in order to ensure that the user is not asked to supply, for example, the same piece of information it is requesting from the system. The "I don't know" stack 122 generally contains (frame, property) pairs that represent information the user does not know about. For example, if the user responds with "I don't know" to a question "What is the flight number?" then the pair (Flight, Number) is pushed onto the "I don't know" stack 122 by the disambiguator 104 via the push operation 142. The "I don't know" stack 122 is used by the question selection policy 110 in determining what question to ask the user, as indicated by the search operation 154. For example, the dialogue manager will not ask the user about the flight number again if he or she has previously indicated that they do not know it. The ambiguous stack 124 contains interpretation trees that have been determined to be ambiguous and therefore require clarification, such as the ambiguous trees shown in FIGS. 4 and 5.

The prompter 108 determines whether or not a script is present for processing a given user request. A script refers generally to a set of trees used to initiate questions that the user needs to answer to allow the request to be processed. A script can be useful in applications in which the dialogue processing system is to assume an active role and ask the user an initial question. A number of scripts can be stored in the script stack 126. If a script is present for a given request, the prompter 108 pops the first tree of that script from the script stack 126, as indicated by pop operation 152, and passes it to the clarifier 138. If there is no script for a particular user request, the prompter 108 waits for the user to ask a question. The question the user asks then gets transformed by the prompter 108 into an interpretation tree, and the interpretation tree is sent to the clarifier 106. The prompter 108 also creates an interpretation tree for any question posed to the user and passes it to the clarifier 106.

The clarifier 106 is responsible for determining if an interpretation tree that it receives from either the prompter 108 or the question selection policy 110 is ambiguous. It uses request operation 138 to request a tree from the prompter 108. If a tree received by the clarifier 106 is ambiguous, the clarifier 106 sends a message to the question policy 110 via an ask_about operation 148 in order to determine what question or questions should be asked of the user to resolve the ambiguity. The clarifier 106 also places the ambiguous tree on the ambiguous stack 124, using push operation 146. The clarifier 106 then asks the question or questions which the question policy 110 has directed it to ask in order to resolve the ambiguity, and sends an expected tree to the prompter 108. The prompter 108 then waits for the user's response and fills in the appropriate properties in the expected tree to form a corresponding interpretation tree.

Unlike the clarifier 106, which is generally responsible for only one ambiguous tree at a time, the disambiguator 104 is responsible for the entire ambiguous stack 124. The disambiguator 104 asks the user questions and applies the above-described collapsing process until the ambiguous stack 124 is empty. The disambiguator 104 is also responsible for adding (frame, property) pairs to the "I don't know" stack 122. For example, if the collapsing process is not successful, then the disambiguator 104 checks to see if the user has responded "I don't know" to a question. If the user has responded "I don't know," the disambiguator 104 pushes the corresponding (frame, property) pair to the "I don't know" stack 122 using push operation 142. The disambiguator 104 removes trees from the ambiguous stack using pop operation 144.

The application interface 102 is responsible for interfacing with the application 34 of FIG. 2. Once the disambiguator 104 has arrived at an unambiguous tree with no missing information, it sends the corresponding request to the application interface 102. The application interface 102 then passes the tree along to the input filter 38 of FIG. 2 for proper translation into a form suitable for the application 34. For example, in a database application such as a flight reservation system, this translation process may involve converting the tree representation into standard query language (SQL) statements. The application interface 102 also receives information from the output filter 40 of FIG. 2. The output filter 40 converts the information retrieved from the application into a tree to be passed to the application interface 102. The application interface 102 is also responsible for pushing (frame, property) pairs onto the knowledge stack 120 as indicated by push operation 140. It should be understood that the implementation of the dialogue manager 30 shown in FIG. 6 is exemplary only, and that numerous alternative embodiments may also be used to implement the dialogue management techniques of the invention.

The present invention provides an object-oriented, rule-based approach to dialogue management which uses predefined frames as a representation of a particular dialogue processing task. A dialogue manager in the system then uses these task definitions to initiate a dialogue motivated by particular dialogue principles, selecting questions to ask a user based on weights which indicate the relative importance of particular frame properties. The system is thereby able to conduct an intelligent dialogue in numerous different applications. The dialogue management techniques are substantially independent of the particular dialogue processing application, and can recognize particular properties in any given set of inputs received from an application. The dialogue manager of the present invention therefore provides considerable improvement relative to, for example, a finite-state system approach which requires that all of the possible states and interconnections of a given dialogue application be incorporated into the dialogue processing routines of the dialogue manager.

The above-described embodiments of the invention are intended to be illustrative only. Numerous alternative embodiments may be devised by those skilled in the art without departing from the scope of the following claims.

What is claimed is:

1. A method for use in a processing system for managing a dialogue between the system and a user, the method comprising the steps of:

receiving an input signal representing one of speech and text associated with at least a portion of the dialogue;

processing a set of frames characterizing a subject of the dialogue, associated with the input signal, each frame including one or more properties that describe a corresponding object which may be referenced during the dialogue, wherein a weight is assigned to each of at least a subset of the properties represented by the set of frames, such that the assigned weights indicate the relative importance of the corresponding properties;

utilizing the weights to determine which of a plurality of possible responses the system should generate for a given user input during the dialogue; and generating an output signal for sensory perception by the user representing at least one of the plurality of possible responses.

2. The method of claim 1 wherein the object corresponding to a given one of the frames is an entity for which information has been stored in a database accessible to the system, and a property describing the entity is a name of the entity.

3. The method of claim 1 further including the step of separating the properties into static properties and dynamic properties, wherein static properties are defined as part of an application running on the processing system, and dynamic properties are those properties that are determined based on a current context of the dialogue.

4. The method of claim 3 wherein the static properties include approximate properties and properties that are computationally inexpensive to retrieve from the application.

5. The method of claim 3 wherein the dynamic properties include properties that are bound in the context of a user request, properties that are requested by the user, and any other properties that are not static.

6. The method of claim 3 further including the steps of defining a number of classes of properties, wherein each of the classes is defined as a logic function of different sets of static and dynamic properties, and utilizing the class definitions in conjunction with the weights to determine which of a plurality of possible responses the system should generate for a given user input during the dialogue.

7. The method of claim 1 further including the step of determining a property about which the user will be queried in an initial system query, by computing an expected number of subsequent queries for each of the properties of one or more of the frames.

8. The method of claim 7 wherein the step of determining a property about which the user will be queried further includes the steps of:

selecting one of the properties and designating it as a first property;

computing the expected number of subsequent queries given that the first property is the property the user is asked about first;

repeating the selecting and computing steps for each of the remaining properties; and selecting the property that yields the minimum expected number of subsequent queries for use in the initial system query.

9. The method of claim 1 further including the steps of identifying a particular one of a plurality of dialogue motivators associated with the given user input, and utilizing the identified dialogue motivator in conjunction with the weights to determine which of a plurality of possible responses the system should generate for a given user input during the dialogue.

10. The method of claim 1 wherein the processing and utilizing steps are implemented in a dialogue manager which serves as an interface between the user and an application running on the system and defining the set of frames, the method further including the steps of:

converting the user input to a tree representation in the dialogue manager; and supplying the tree representation to an input filter which serves as an interface between the dialogue manager and the application, such that the input filter extracts information from the tree representation and places it in a format suitable for processing by the application.

11. The method of claim 10 wherein the user input comprises a user request for information from the application, the method further including the steps of:

executing the user request in the application to generate a response;

passing the response through an output filter to place it in a format suitable for processing by the dialogue manager;

clarifying the user request in the dialogue manager by directing at least one question to the user, if executing the user request in the application led to any ambiguity; and presenting the response to the user if executing the user request in the application did not lead to any ambiguity.

12. The method of claim 11 wherein the dialogue manager generates an interpretation tree representation of the response, the interpretation tree representation including a different branch for each of a plurality of possible interpretations of the user request.

13. An apparatus for use in a processing system for managing a dialogue between the system and a user, the apparatus comprising:

an input device for processing an input signal representing one of speech and text associated with at least a portion of the dialogue;

a memory coupled to the input device for storing a set of frames characterizing a subject of the dialogue, associated with the input signal, each frame including one or more properties that describe a corresponding object which may be referenced during the dialogue, wherein a weight is assigned to each of at least a subset of the properties represented by the set of frames, such that the assigned weights indicate the relative importance of the corresponding properties;

a processor coupled to the input device and the memory for processing the set of frames and utilizing the weights to determine which of a plurality of possible responses the system should generate for a given user input during the dialogue; and an output device coupled to the processor and the memory for generating an output signal for sensory perception by the user representing at least one of the plurality of possible responses.

14. The apparatus of claim 13 wherein the object corresponding to a given one of the frames is an entity for which information has been stored in a database accessible to the system, and a property describing the entity is a name of the entity.

15. The apparatus of claim 13 wherein the properties include static properties and dynamic properties, wherein static properties are defined as part of an application running on the processing system, and dynamic properties are those properties that are determined based on a current context of the dialogue.

16. The apparatus of claim 15 wherein the static properties include approximate properties and properties that are computationally inexpensive to retrieve from the application.

17. The apparatus of claim 15 wherein the dynamic properties include properties that are bound in the context of a user request, properties that are requested by the user, and any other properties that are not static.

18. The apparatus of claim 15 wherein the properties are further grouped into a number of classes of properties, wherein each of the classes is defined as a logic function of different sets of static and dynamic properties, and the processor is further operative to utilize the class definitions in conjunction with the weights to determine which of a plurality of possible responses the system should generate for a given user input during the dialogue.

19. The apparatus of claim 13 wherein the processor is further operative to determine a property about which the user will be queried in an initial system query, by computing an expected number of subsequent queries for each of the properties of one or more of the frames.

20. The apparatus of claim 19 wherein the processor determines a property about which the user will be queried by selecting one of the properties and designating it as a first property, computing the expected number of subsequent queries given that the first property is the property the user is asked about first, repeating the selecting and computing operations for each of the remaining properties, and selecting the property that yields the minimum expected number of subsequent queries for use in the initial system query.

21. The apparatus of claim 13 wherein the processor is further operative to identify a particular one of a plurality of dialogue motivators associated with the given user input, and to utilize the identified dialogue motivator in conjunction with the weights to determine which of a plurality of possible responses the system should generate for a given user input during the dialogue.

22. The apparatus of claim 13 wherein the processor is operative to implement an application running on the system, and a dialogue manager which serves as an interface between the user and the application, and wherein the processor is further operative to convert the user input to a tree representation using the dialogue manager, and to filter the tree representation to place it in a format suitable for processing by the application.

23. The apparatus of claim 22 wherein the user input comprises a user request for information from the application and the application executes the user to generate a response, and wherein the processor filters the response to place it in a format suitable for processing by the dialogue manager.

24. The apparatus of claim 23 wherein the dialogue manager is operative to clarify the user request by directing at least one question to the user, if executing the user request in the application led to any ambiguity, and to present the response to the user if executing the user request in the application did not lead to any ambiguity.

25. The apparatus of claim 23 wherein the dialogue manager generates an interpretation tree representation of the response, the interpretation tree representation including a different branch for each of a plurality of possible interpretations of the user request.

26. A method for use in a processing system for managing a dialogue between the system and a user, the method comprising the steps of:

processing a set of frames characterizing a subject of the dialogue, in response to receipt of an input signal representing one of speech and text associated with at least a portion of the dialogue, each frame including one or more properties that describe a corresponding object which may be referenced during the dialogue, wherein a weight is assigned to each of at least a subset of the properties represented by the set of frames, such that the assigned weights indicate the relative importance of the corresponding properties; and utilizing the weights to determine which of a plurality of possible responses the system should generate in the form of an output signal for sensory perception by the user representing at least one of the plurality of possible responses for a given user input during the dialogue.

27. An article of manufacture for use in a processing system for managing a dialogue between the system and a user, comprising a machine readable medium containing one or more programs which when executed implement the steps of:

processing a set of frames characterizing a subject of the dialogue, in response to receipt of an input signal representing one of speech and text associated with at least a portion of the dialogue, each frame including one or more properties that describe a corresponding object which may be referenced during the dialogue, wherein a weight is assigned to each of at least a subset of the properties represented by the set of frames, such that the assigned weights indicate the relative importance of the corresponding properties; and utilizing the weights to determine which of a plurality of possible responses the system should generate for a given user input during the dialogue.

* * * * *